United States Patent [19]

Boster

[11] Patent Number: 4,932,836
[45] Date of Patent: Jun. 12, 1990

[54] PUMP WITH HEAT EXCHANGER
[75] Inventor: Clark S. Boster, Whittier, Calif.
[73] Assignee: BW/IP International, Inc., Long Beach, Calif.
[21] Appl. No.: 352,954
[22] Filed: May 11, 1989

Related U.S. Application Data

[60] Continuation of Ser. No. 205,272, Jun. 10, 1988, abandoned, which is a division of Ser. No. 26,767, Mar. 17, 1987, Pat. No. 4,775,293.

[51] Int. Cl.$^5$ .............................................. F01D 1/02
[52] U.S. Cl. ................................. 415/201; 415/170.1; 415/110; 417/360; 285/24; 220/75
[58] Field of Search ............. 415/201, 219 C, 170 A; 417/360, 423.14, 423.15; 285/24, 27; 220/75, 66, 5 A

[56] References Cited

U.S. PATENT DOCUMENTS

| | | | |
|---|---|---|---|
| 2,900,919 | 8/1959 | Anderson | 415/201 |
| 3,188,966 | 6/1965 | Tetlow | 415/170 A |
| 3,478,689 | 11/1969 | Ball | 417/373 |
| 3,540,834 | 11/1970 | Allerton | 415/219 C |
| 3,934,752 | 1/1976 | Ravicchio | 415/201 |
| 4,099,890 | 7/1978 | Murakami | 415/170 A |
| 4,661,044 | 4/1987 | Freeland | 415/201 |
| 4,701,103 | 10/1987 | Medgvesy | 415/219 C |

Primary Examiner—Edward K. Look
Assistant Examiner—Therese M. Newholm
Attorney, Agent, or Firm—Aubrey L. Burgess

[57] ABSTRACT

A pump having a heat exchanger including a rotating baffle sleeve secured to the pump shaft. A seal baffle on the rotating baffle sleeve extends over the pump seal assembly cartridge. A cooling cylinder containing circulating component cooling water is suspended within the rotating baffle sleeve and defines a flow passageway therein for cooling heated product water, before the product water contacts the shaft seal. A seal injector distributor ring uniformly distributes seal injection water to the seal. A thermal shield in the heat exchanger reduces thermal stresses in the heat exchanger. A slotted or grooved keyway spacer ring facilitates replacement and alignment of a hydrostatic bearing.

6 Claims, 4 Drawing Sheets

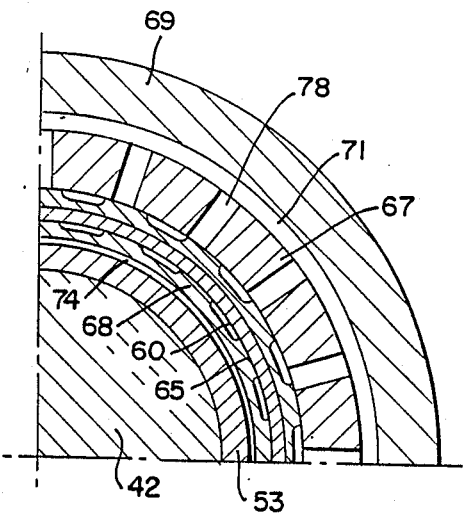
FIG. 5.
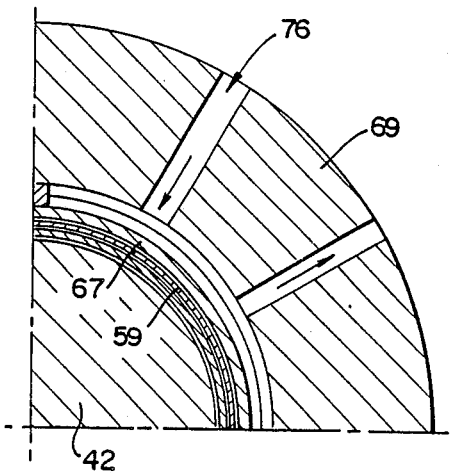
FIG. 7.
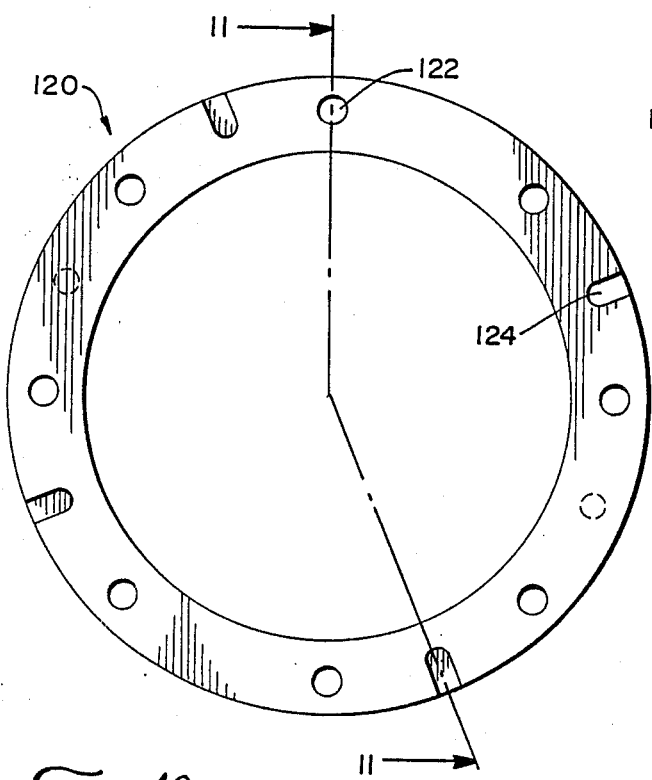
FIG. 10.
FIG. 11.
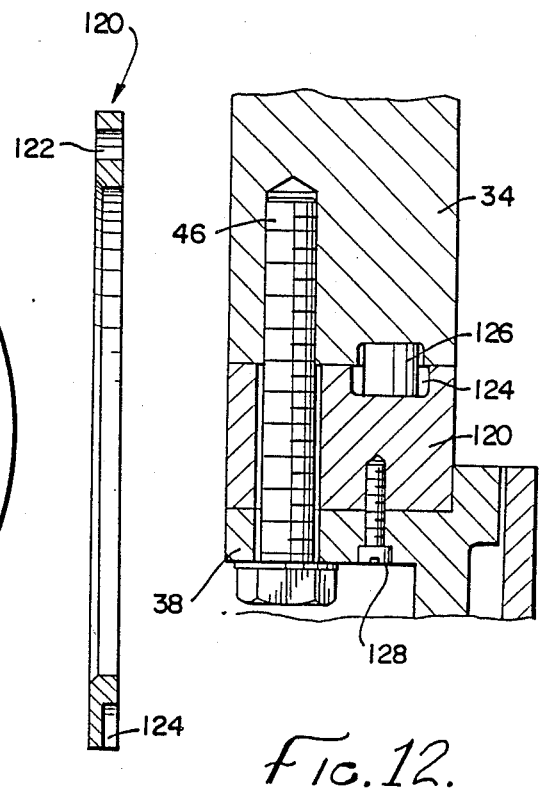
FIG. 12.

PUMP WITH HEAT EXCHANGER

REFERENCE TO COPENDING APPLICATIONS

This is a CONTINUATION, of application Ser. No. 07/205,272, filed June 10, 1988, now abandoned, which is a division of my copending application, Ser. No. 026,767, filed Mar. 17, 1987, now U.S. Pat. No. 4,775,293 and entitled PUMP WITH HEAT EXCHANGER.

BACKGROUND OF THE INVENTION

The field of the present invention is pumps with heat exchangers.

In pumps used in connection with hot liquids, such as reactor cooling water, it is often advantageous or necessary to cool the pump, or pump components such as mechanical seals. To this end, heat exchangers may be provided with the pump to provide a cooling function.

For example, U.S. Pat. No. 3,478,689 discloses a high-pressure, high temperature reactor circulating pump having a thermal plate and a heat exchanger shield for cooling a shaft seal. In addition, U.S. Pat. No. 3,459,430 discloses a mechanical seal assembly having cooling coils within a cooling jacket. A recirculation impeller driven by the pump shaft causes liquid to flow over the heat dissipating surfaces of a mechanical seal cartridge and a radial bearing, to cool these components. The heat absorbed in the liquid is dissipated from the cooling coil into a liquid that flows over and around the coil.

An improved heat exchanger is described in U.S. Pat. No. 4,005,747 for use with a pump assembly incorporating mechanical seals, such that the seals are cooled not only during pump operation, but also in the hot-standby condition. This heat exchanger is constructed with a rotating baffle which defines the path of hot fluid flow and which when rotating, causes rotational motion in the hot fluid. The heat exchanger is designed so that the coolant flows in a defined path along the pump shaft to the mechanical seals.

Although these known cooling techniques have performed well in the past, a further improvement in the cooling of the mechanical seals would prolong their useful life and improve reliability.

SUMMARY OF THE INVENTION

The present invention is directed to an improved heat exchanger for cooling a mechanical seal assembly within a pump. To this end, a pump heat exchanger includes a cylindrical baffle sleeve releasably attached to the pump shaft with the baffle sleeve having a seal baffle extending over and substantially enclosing the mechanical seal. A cooling cylinder is disposed within the rotating baffle and forms a flow passageway therein. The cooling cylinder is supplied with circulating component cooling water, thereby allowing the cooling cylinder to cool product water flowing through the flow passageway.

For use in pumps operating with seal injection water, a seal injection distributor ring is provided around the seal to uniformly distribute the injection water.

In addition, a thermal shield including spaced apart disks is provided within the heat exchanger adjacent to the cooling cylinder to reduce temperature induced stresses in the pump.

A slotted or grooved keyway spacer ring is further provided in between the pump cover and the hydrostatic bearing to simplify the hydrostatic bearing replacement alignment procedure.

Accordingly, it is an object of the present invention to provide an improved heat exchanger for cooling a pump seal.

It is also an object of the present invention to provide a pump cover having a seal injection distributor ring for uniformly distributing seal injection water, a thermal disk shield within a heat exchanger to reduce stresses, and a slotted or grooved keyway spacer ring to simplify hydrostatic bearing installation and replacement.

Other and further objects and advantages will appear hereinafter.

BRIEF DESCRIPTION OF THE DRAWINGS

In the drawings, wherein similar reference characters denote similar elements throughout the several views:

FIG. 5 is a section view taken along line 5—5 of FIG. 3;

FIG. 7 is a section view taken along line 7—7 of FIG. 3;

FIG. 10 is a front elevational view of the slotted or grooved keyway spacer ring illustrated in FIG. 3;

FIG. 11 is a section view taken along line 11—11 of FIG. 10; and

FIG. 12 is a section view taken along line 12—12 of FIG. 3 illustrating the engagement of the hydrostatic bearing, the slotted or grooved keyway spacer, and the pump cover.

DETAILED DESCRIPTION OF THE PREFERRED EMBODIMENT

Figure 1:
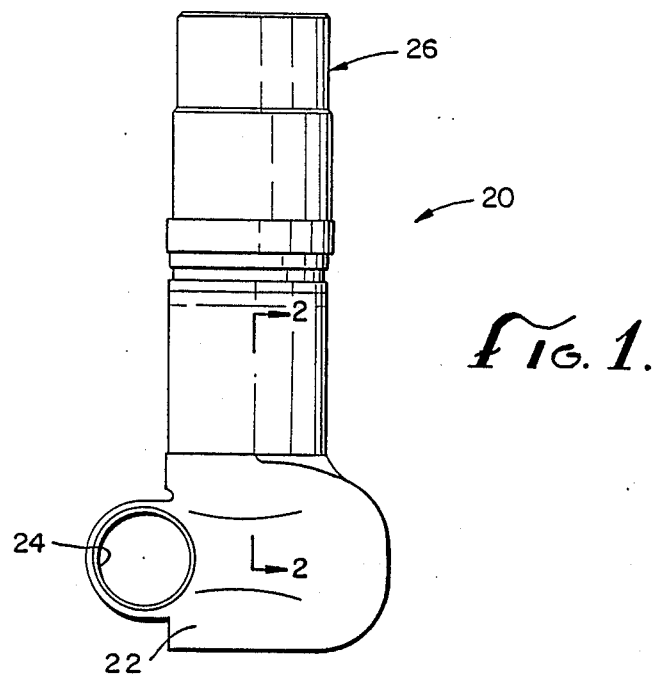
FIG. 1 is a perspective view of a pump and motor assembly.

Turning now in particular to the appended drawings, as shown in FIG. 1, a pump assembly 20 includes a pump housing 22 having a port 24, and a driver mount 26 attached to the pump housing 22.

Figure 2:
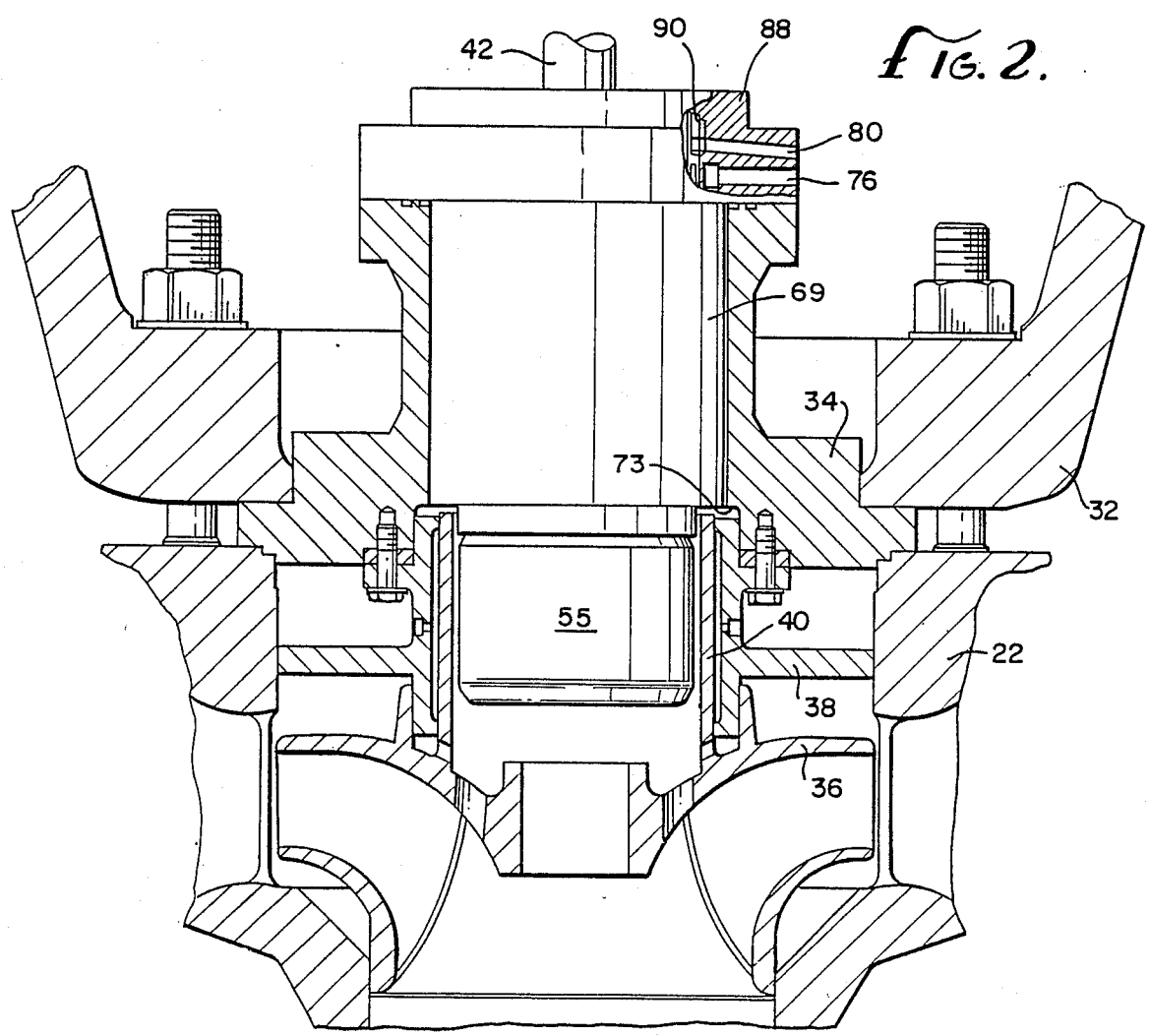
FIG. 2 is a fragmentarily illustrated section view taken along line 2—2 of FIG. 1.
Figure 3:
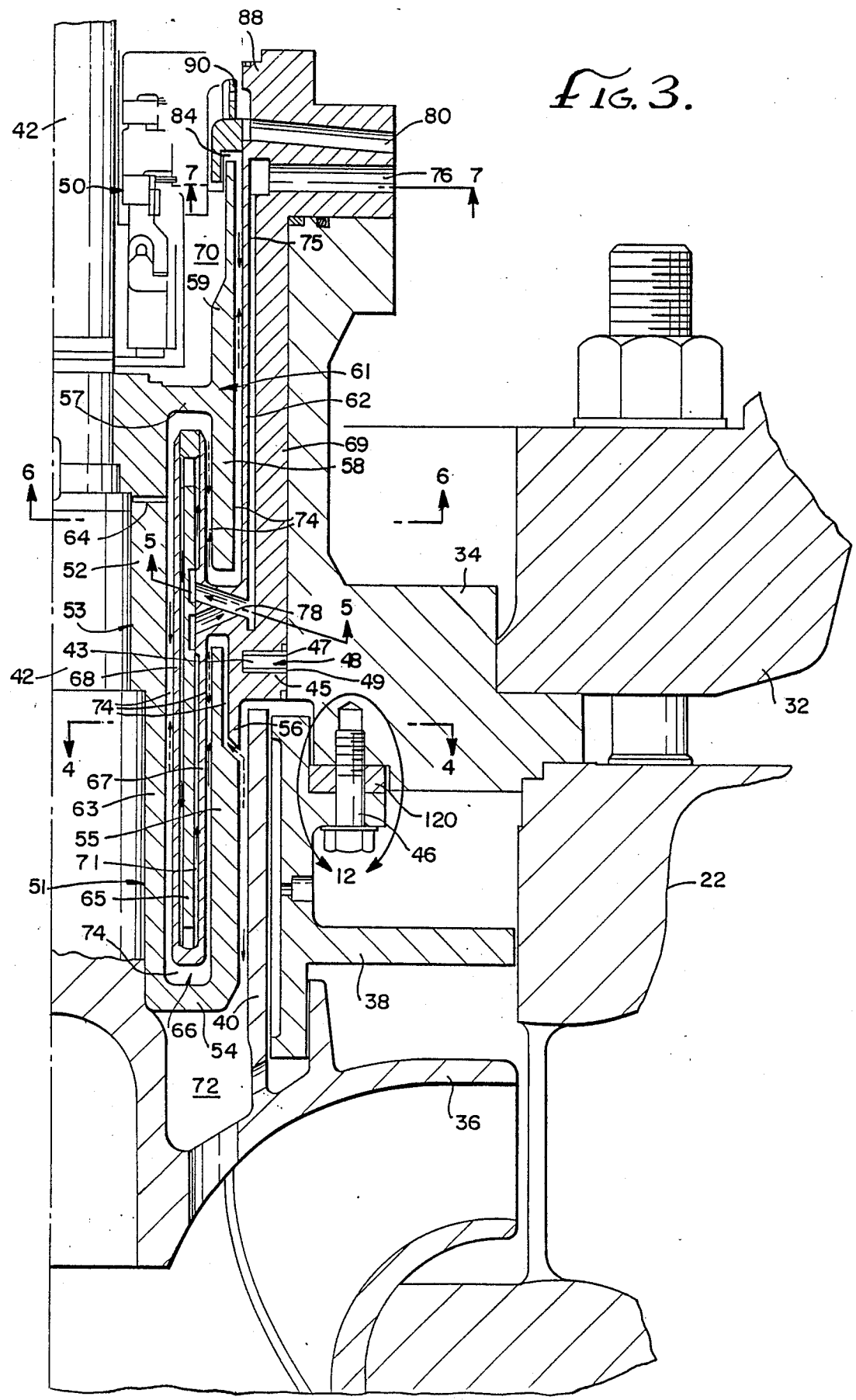
FIG. 3 is an enlarged fragmentarily illustrated section view of the heat exchanger and pump elements illustrated in FIG. 2.

With reference to FIGS. 2 and 3, a pump cover 34 is secured to the pump housing 22 with cover clamp ring 32. The motor 26 which is generally disposed at one end of the pump assembly 20 is attached to a shaft 42 extending substantially through the pump assembly 20 and joined to an impeller 36 which is rotatable within an impeller chamber 72 in the pump housing 22.

With particular reference to FIG. 3, the impeller 36 includes a cylindrical journal 40 extending from the back surface of the impeller into a recess 73 in the impeller chamber 72. A cylindrical hydrostatic bearing 38 is joined to the cover 34 by a ring of fasteners 46, such that the hydrostatic bearing 38 surrounds the journal 40, thereby maintaining the journal and impeller in position and providing a bearing function. To simplify alignment of the hydrostatic bearing 38 during its installation into the pump assembly 20, a slotted or grooved keyway spacer ring 120 may be installed in between the pump cover 34 and the hydrostatic bearing 38, as shown in FIG. 3.

In order to primarily contain the pumped or product fluid or water within the impeller chamber 72, and to prevent the product water from passing out of the pump housing 22 into the motor 26 along the shaft 42, a mechanical seal or seal cartridge assembly 50 is installed over the shaft 42 in between the motor 26 and the impeller 36. In certain applications, the product water pressure may reach 2500 psi so that the use of a multistage seal cartridge assembly, such as the assembly disclosed in U.S. Pat. No. 3,459,430, is appropriate. This type of seal relies on elastic materials and the very precise near engagement of solid sealing rings with the shaft. As the product water being driven by the impeller can reach 575° F., the seal 50 should be cooled in order to maintain its sealing effectiveness.

According to the present invention, a heat exchanger (collectively designated by 51) is provided within the pump assembly 20 to cool the seal 50. Referring again to FIG. 3, the heat exchanger 51 includes a rotating baffle sleeve 52 which is releasably but securely and intimately mounted onto the shaft 42. The rotating baffle sleeve 52 includes a base 53 configured to accurately match and mate with the profile of the shaft 42.

At the lower or impeller end of the base 53 is a lower bridge 54 integral with and extending radially outwardly from the base 53. The lower bridge 54 is joined to a perpendicular lower facing section 55 which extends towards a central position of the heat exchanger and away from the impeller 36 in a direction generally parallel to the base 53. The lower facing section 55 includes a tapered segment 56 at its end. Similarly, at the upper or seal end of the base 53 is an upper bridge 57 integrally joined with the base 53 and extending radially outwardly to join an upper facing section 58 mounted perpendicularly thereto. While the upper facing section 58 extends towards the lower facing section 55 in a direction parallel to the base 53, a seal baffle 59 extends in the opposite direction and substantially surrounds the entire seal 50.

To facilitate manufacture and assembly of the rotating baffle sleeve 52, the sleeve may be formed by an upper baffle 61 and a lower baffle 63 releasably joined together at a joint 64.

A cooling cylinder 66 is generally suspended and fixed in position within the space in the rotating baffle sleeve 52 formed by the upper facing section 58, the lower facing section 55, and the base 53. The cooling cylinder 66 is formed by an inner enclosing cylinder 68 having a grooved outer surface, which is spaced apart from an outer enclosing cylinder 67 which has a grooved inner surface. The inner and outer enclosing cylinders are joined together at their ends. The outer enclosing cylinder 67 extends beyond the rotating baffle sleeve and is attached to and supported by a barrel support 69. As the cooling cyclinder 66 is suspended within the rotating baffle sleeve 52, a flow passageway 74 is formed by the outside surfaces of the cooling cylinder 66 and the inside surfaces of the rotating baffle sleeve 52. The flow passageway 74 opens at one end into the impeller chamber 72, extends through the heat exchanger 51, over the seal baffle 59 to a juncture 84 and then into a seal chamber 70.

Figure 4:
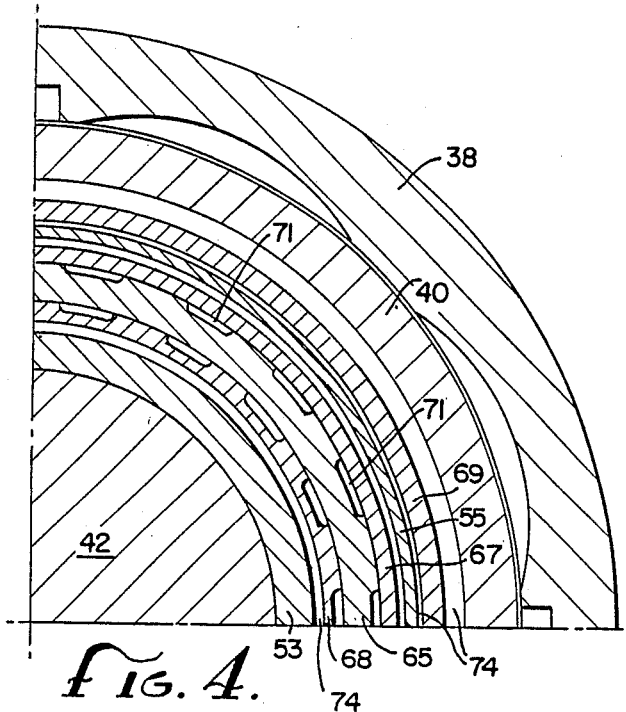
FIG. 4 is a section view taken along line 4—4 of FIG. 3.
Figure 6:
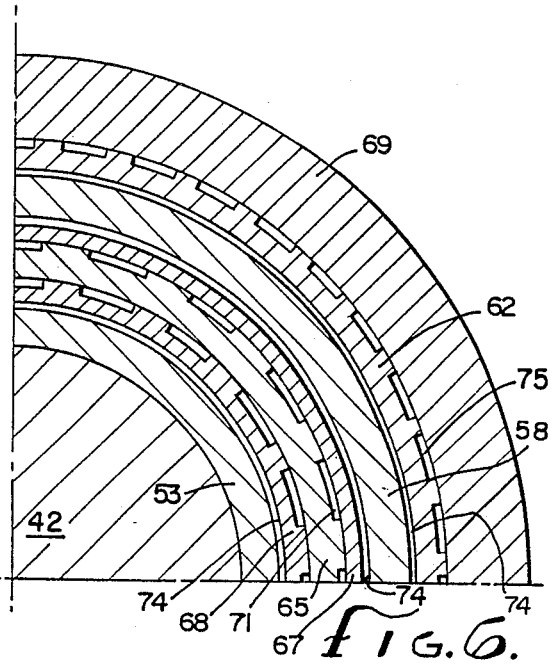
FIG. 6 is a section view taken along line 6—6 of FIG. 3.

As shown in FIGS. 4, 5, and 6, contained within the cooling cylinder 66 is a spacer cylinder 65 having a plurality of radially spaced apart grooves 60 on its outside surface. Similar to the flow passageway 74, the grooves 60 on the spacer cylinder 65 form a component cooling water passageway 71 in between the spacer cylinder 65 and the cooling cylinder 66. Passageway 71 is linked to an inlet 78 and an outlet 79 formed within the barrel support 69. A pair of ducts 75 in the barrel support 69 link the inlet 78 and the outlet 79 to a component cooling water source through a port 76 in the pump cover 34.

Adjacent to the component water passageway 76 is a seal injection water supply duct 80 which supplies seal injection water to an injection water distributor ring 90 positioned in between the injection supply duct 80 and the duct junction 84 adjacent to the seal 50.

Figure 8:
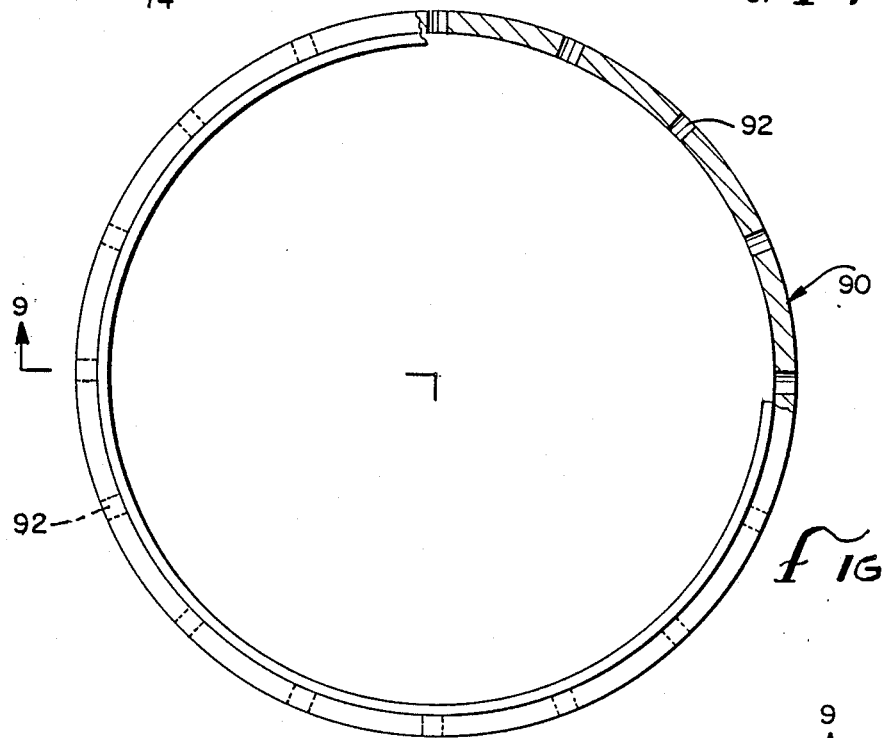
FIG. 8 is a front elevational view of a seal injection distribution ring.
Figure 9:
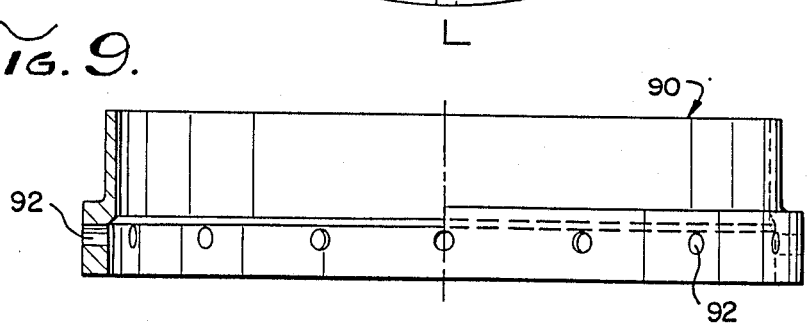
FIG. 9 is a side elevational view in part section thereof.

The seal injection distributor ring 90, as shown in FIGS. 8 and 9, comprises an annular ring having a plurality of spaced apart distribution openings 92. The injection water supply duct 80 connects to the distributor ring 90 at a single location. As shown in FIG. 3, the distributor ring 90 is disposed within a recess in an upper flange 88 of the barrel support 69. As the injection water enters the distributor ring 90 it is uniformly distributed circumferentially around the ring via the ring opening 92.

At the end of the barrel support 69 adjacent to the impeller chamber recess 73 is a thermal shield 48 set into an annular groove 45 in the barrel support 69. The thermal shield 48 includes 0 to a plural of spaced apart rings 47 and 49 forming a stagnant water cavity 43 therebetween, as best shown in FIG. 3. The insulation provided by the thermal shield 48 acts to prevent sudden and extreme temperature variations in the portion of the barrel support facing the recess 73, thereby reducing temperature related stresses in the barrel support 69. Alternatively, the heat shield may comprise a thickened material section at the end of the barrel support 69.

FIGS. 10, 11, and 12 illustrate a slotted or grooved keyway spacer ring 120 which is disposed in between the pump cover 34 and the hydrostatic bearing 38. The slotted keyway spacer ring 120 has radially spaced apart holes 122 in alignment with the fasteners 46 engaging the cover 34. The holes 122 are larger in diameter than the diameter of the fasteners 46, as illustrated in FIG. 12, permitting the accurate positioning of the bearing 38 over the journal 40. In addition, the spacer ring 120 includes four or more equally spaced apart radial keyway slots or grooves 124 which engage keys 126 on the pump cover 34.

The pump has two modes of operation, depending upon whether seal injection water is available. During normal operation, seal injection water is available and flows through the duct 80, is distributed by injection distributor ring 90 and runs into the seal chamber 70. The seal injection water is preferably supplied at approx. 105 F., so that the seal 50 and seal cartridge is maintained at a relatively cool operating temperature. In addition, the seal injection water is clean water so that dirt and impurities are prevented from reaching the seal 50 and the cartridge. The solid arrows in FIG. 3 represent the flow pattern in the pump during normal operation with seal injection water, and the phantom arrows represent the flow pattern when no seal injection water is available.

Once the seal chamber 70 is filled with seal injection water, a small portion of the water in the seal chamber 70 flows through the seal 50 and the seal cartridge, and the remaining seal injection water supply flows outwardly through the junction 84 through the heat exchange flow passageway 74 in the heat exchanger 51, and then into the impeller chamber 72 where it becomes part of the product water. Simultaneously, component cooling water is provided through the ducts 76 and 75 and through the inlet 78 into the cooling cylinder 66. The component cooling water then circulates through the cooling cylinder 66, guided by the openings and grooves in the spacer cylinder 65 and the inner and outer enclosing cylinders 67 and 68, and then passes through the outlet 79 and is returned to the component cooling water source. As the seal injection water flowing through the heat exchange flow passageway 74 is at a relatively low temperature, and at approximately the same temperature as the product cooling water flowing within the product cooling water passageway 71, there is little or no heat exchange occurring when seal injection water is available.

However, in the second mode of operation of the pump, i.e., when there is no seal injection water available (or in pumps which are not adapted to accept seal injection water) the operation of the heat exchanger 51 becomes critical. When no seal injection water is provided, the high temperature (e.g. 575 F.) product water enters the flow passageway 74 from the impeller chamber 72, flows through the heat exchanger 51 and the junction 84 and into the seal chamber 70. As the cooling cylinder 66 is continuously provided with a flow of component cooling water at e.g. 90 F., there is a very large temperature difference between the product water flowing through passageway 74 and the component cooling water flowing through passageway 71. Therefore, a high rate of heat transfer occurs through the walls of the cooling cylinder (i.e., through the outer enclosing cylinder 67 and the inner enclosing cylinder 68). Thus the product water is substantially cooled as it flows through the heat exchanger 51 before it comes into contact with the seal 50 and seal cartridge. As a result, even in the absence of seal injection water, the seal is maintained at an operational acceptable temperature. Moreover, the rotating baffle sleeve helps in buffering temperature changes induced in the seal 50 and seal cartridge and mitigates temperature related stresses in the shaft.

The heat exchanger 51 achieves a high level of cooling efficiency by virtue of the large amount of surface area provided, the dual directional flow of the product cooling water therein, as well as the counterflow cooling design. While the seal baffle 59 provides an extended heat exchange surface, it also insures that the seal chamber 70 is filled with injection water, before any injection water flows into the heat exchanger 51 at startup. In addition, the centrifugal effect imparted to the water by the seal baffle tends to drive suspended particles outwardly and away from the seal 50. Furthermore with the present construction a major heat transfer area is located in a relatively cold region of the heat exchanger, i.e., the last pass of the product water through the heat exchanger occurs adjacent to the relatively cool upper baffle 61. This configuration helps to prevent a reduction in cooling effectiveness caused by conductive heat transfer from impeller chamber surfaces into the already cooled product water from toward the seal cartridge.

As the component cooling water flows continuously regardless of the presence or absence of the seal injection water, a very high temperature gradient is established across the end of the barrel support 69, because component cooling water at e.g. 90 F. is separated from product water at e.g. 575 F. by a relatively thin wall. In order to reduce thermal stresses in this region, the thermal shield 48 is provided at the end of the barrel support 69, and acts as an insulator therein.

The heat exchanger 51 is designed so that it may be readily retrofitted onto existing pumps with replacement of the existing pump cover. In addition, the heat exchanger 51 is easily removable from the pump assembly 20 for inspection or service. Initially, the seal 50 is slidably removed from the shaft 42. The upper baffle 61, which may be held in position on the shaft with a lock ring, is then similarly slidably removed from the shaft 42. With the upper baffle 61 now out of the way, the entire heat exchanger assembly 51 including the cooling cylinder 66 and its components 67, 68, and 65, as well as the barrel support 69 carrying the ducts 75 and 76, the inlet 78 and outlet 79, and the thermal shield 49, can all then be removed as a single unit. Thereafter, the lower baffle 63 may also be slidably removed from the shaft 42. During reassembly, the above-described steps are reversed.

During installation or replacement of the hydrostatic bearing 38, the bearing is secured to the radially slotted keyway spacer ring 120 via retainer bolts 128 received in threaded openings in the ring 120, as shown on FIG. 12. The keyway slots or grooves 124 in the spacer ring 120 are then engaged over the keys 126 protruding from the pump cover 34, in order to accurately position the bearing 38 over the journal 40 without the need for repeated time consuming indicating measurements after the initial installation of the hydrostatic bearing. The radially slotted keyway spacer ring feature is a significant advantage during bearing replacement because the pump may be used in nuclear power generation installations and become radioactive, thereby severely limiting the amount of time any single operator has available for servicing the pump.

The slots or grooves 124 may open to the periphery of the ring 120, as illustrated in FIGS. 10 and 11, or be formed within the confines of the ring 120, as illustrated in FIG. 12.

Thus, a pump having an improved heat exchanger for cooling a seal, as well as a novel seal injection water distributor ring, a thermal shield, and a radially slotted grooved keyway spacer ring for a hydrostatic bearing are disclosed. While embodiments and applications of this invention have been shown and described it would be apparent to those skilled in he art that many more modifications are possible without departing from the inventive concepts herein. The invention, therefore, is not to be restricted except in the spirit of the appended claims.

I claim:

1. A radially grooved keyway spacer ring for providing alignment between a hydrostatic bearing and a pump cover comprising:
   a ring positioned between said cover and said hydrostatic bearing; said ring having a plurality of equally spaced holes and at least four grooves equally radially spaced apart and radially oriented.

2. In a pump having a pump cover and a hydrostatic bearing, the improvement comprising:
   a spacer ring positioned between said cover and said hydrostatic bearing;
   said spacer ring having a plurality of circumferentially spaced holes and a plurality of circumferentially spaced grooves;

key means projecting from said cover and each received in one of said grooves for aligning said cover and said hydrostatic bearing; and bolt means passing through at least some of said holes for connecting said aligned cover and hydrostatic bearing.

3. In a pump as recited in claim 2, wherein said grooves are equally spaced and open to the periphery of said ring.

4. In a pump as recited in claim 2, wherein said grooves are equally spaced and are formed within the confines of said ring.

5. In a pump as recited in claim 2, wherein said holes are larger in diameter than the diameter of said bolts to insure the said alignment of said cover and hydrostatic bearing when connected.

6. In a pump as in claim 2, wherein said circumferentially spaced holes are equally spaced from each other and said grooves are equally spaced from each other.

* * * * *